United States Patent

Dawda et al.

[11] Patent Number: 5,941,511
[45] Date of Patent: Aug. 24, 1999

[54] BUSHING APPARATUS

[75] Inventors: Timothy James Dawda, Royal Oak; Gregory Glen Sobek, Romeo; Mark Lawrence Bewick, Farmington Hills, all of Mich.

[73] Assignee: Ford Global Technologies, Inc., Dearborn, Mich.

[21] Appl. No.: 08/991,932

[22] Filed: Dec. 16, 1997

[51] Int. Cl.⁶ ....................................................... F16F 5/00
[52] U.S. Cl. .................. 267/140.12; 267/281; 267/141.4
[58] Field of Search ............................ 267/140.12, 141.3, 267/141.4, 141.5, 271, 276, 280, 281; 280/124.109, 124.128, 124.138, 124.134

[56] References Cited

U.S. PATENT DOCUMENTS

| | | |
|---|---|---|
| 1,656,856 | 1/1928 | Gagnon . |
| 2,894,772 | 7/1959 | Hitt . |
| 3,584,857 | 6/1971 | Hipsher .................................... 267/281 |
| 4,256,413 | 3/1981 | Abe . |
| 4,721,326 | 1/1988 | Massos et al. . |
| 4,767,108 | 8/1988 | Tanaka et al. ........................ 276/140.1 |
| 5,375,323 | 12/1994 | Sata . |
| 5,595,373 | 1/1997 | Ikeda ..................................... 267/141.4 |

FOREIGN PATENT DOCUMENTS

| | | |
|---|---|---|
| 484894 | 7/1952 | Canada . |
| WO 89/04773 | 6/1989 | WIPO . |

Primary Examiner—Matthew C. Graham
Assistant Examiner—Hargobind S. Sawhney
Attorney, Agent, or Firm—Gregory P. Brown

[57] ABSTRACT

A bushing apparatus improves the axial load capability of attachments of suspension members to structural members of a motor vehicle. The bushing includes an outer sleeve member (16) having an outwardly extending radial flange (36) and an inwardly extending radial flange (40) and an outer diameter so as to allow the bushing device to press fitted into the suspension member. An inner sleeve member (18) is disposed coaxially within the outer sleeve member creating an annular region for a resilient member (20). First and second end washers (22,24) are press fitted into the inner sleeve member. The resilient member 20 also includes first and second projections (52,70) extending radially outward from the resilient member. A stake (90) is formed on a shoulder (92) of the outer sleeve member to retain the outer sleeve member within the suspension member.

15 Claims, 2 Drawing Sheets

BUSHING APPARATUS

BACKGROUND OF THE INVENTION

1. Field of the Invention

The present invention relates generally to bushing devices for motor vehicles. More particularly the bushing apparatus is useful for providing a resilient, pivotal suspension attachment capable of sustaining many cycles of considerable axial load without deteriorating the primary isolation function of the bushing device.

2. Disclosure Information

In the conventional motor vehicle, elastic bushings are used at pivotal connections in a suspension, for example, a control arm bushing may be used to pivotally connect the inboard end of the control arm to a structural member of the vehicle frame or body. Generally, the elastic bushings familiar to those skilled in the art comprise outer and inner metallic sleeves coaxially disposed about a resilient member filling the annular space therebetween. The outer sleeve is pressed into apertures in the inboard end of the control arm and a threaded fastener passes through the inner sleeve for connecting the control arm to the vehicle frame or body. In this configuration, the resilient member allows the control arm to pivot about the axis of the threaded fastener, as well as to translate axially and radially, placing the resilient member in shear and compression, respectively.

It has been observed that certain suspension designs may subject attachment bushings to high axial loading, resulting in higher than normal shear force and strain levels within the resilient member. Efforts to minimize the deleterious effects generally have been unsatisfactory, as they have resulted in increased harshness or unacceptable bushing durability.

It would be desirable to overcome the aforenoted difficulties with previous bushing devices for use in motor vehicles by providing a simple, low cost bushing apparatus for attaching a suspension control arm to a structural member capable of reliably operating under many cycles of high axial shear forces while providing desirable harshness and durability characteristics.

SUMMARY OF THE INVENTION

Therefore, the present invention provides an improvement over conventional vehicles by providing a bushing device for attaching a suspension member to a structural member of a motor vehicle capable of isolating both radial and axial vibration.

In accordance with the present invention, a bushing apparatus for attaching a suspension member to a structural member of a motor vehicle includes an outer sleeve member having an outwardly extending radial flange formed at its first end and an inwardly extending radial flange formed at its second end. The outer sleeve has a predetermined outer diameter sized to allow it to be press fit into the suspension member. The bushing also includes an inner sleeve member disposed coaxially within the outer sleeve member defining an annular region therebetween. A first end washer extends radially outward from a first end of the inner sleeve member and includes a tubular protuberance in a press fit relationship with an inner diameter of the inner sleeve member. A second end washer extends radially outward from a second end of the inner sleeve member and includes a tubular protuberance in a press fit relationship with the inner diameter of the inner sleeve member.

The bushing also includes a resilient member disposed within the annular region between the inner and outer sleeves and has a first projection extending radially outward from a first end of the resilient member between the outwardly extending radial flange and the first end washer. The resilient member also includes a second projection extending radially outward from a second end of the resilient member between the inwardly extending radial flange and the second end washer.

The bushing further includes at least one stake formed on a shoulder of the outer sleeve member between the inwardly extending radial flange and the suspension member, the stake being operative to retain the outer sleeve member within the suspension member.

It is an advantage of the present invention to provide a simple, low cost bushing apparatus low cost bushing apparatus for attaching a suspension control arm to a structural member capable of reliably operating under many cycles of high axial shear forces.

DETAILED DESCRIPTION OF THE PREFERRED EMBODIMENT

Figure 1:
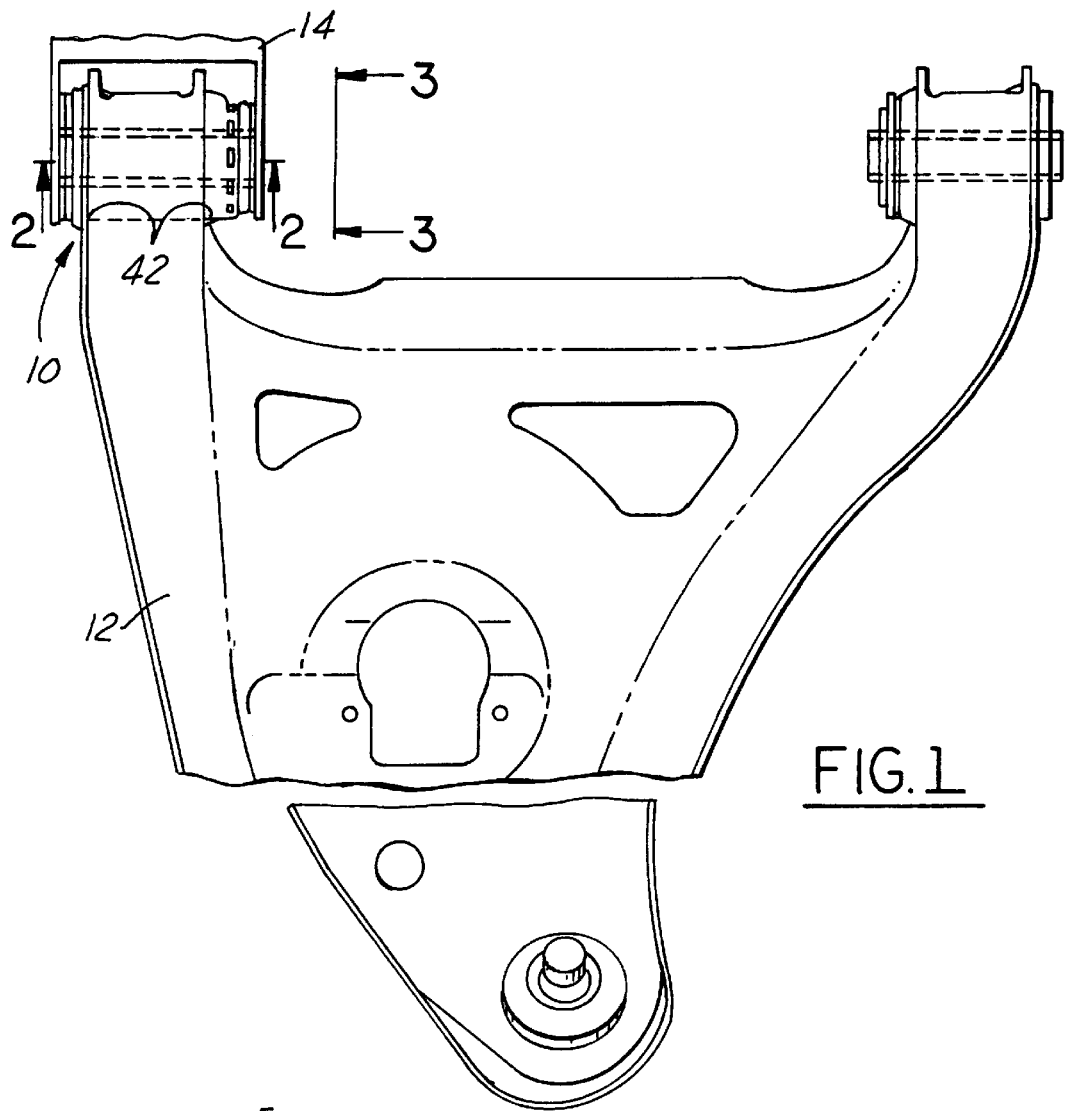
FIG. 1 is a plan view of a suspension member pivotally attached to a structural member of a motor vehicle using a bushing constructed in accordance with the present invention.
Figure 2:
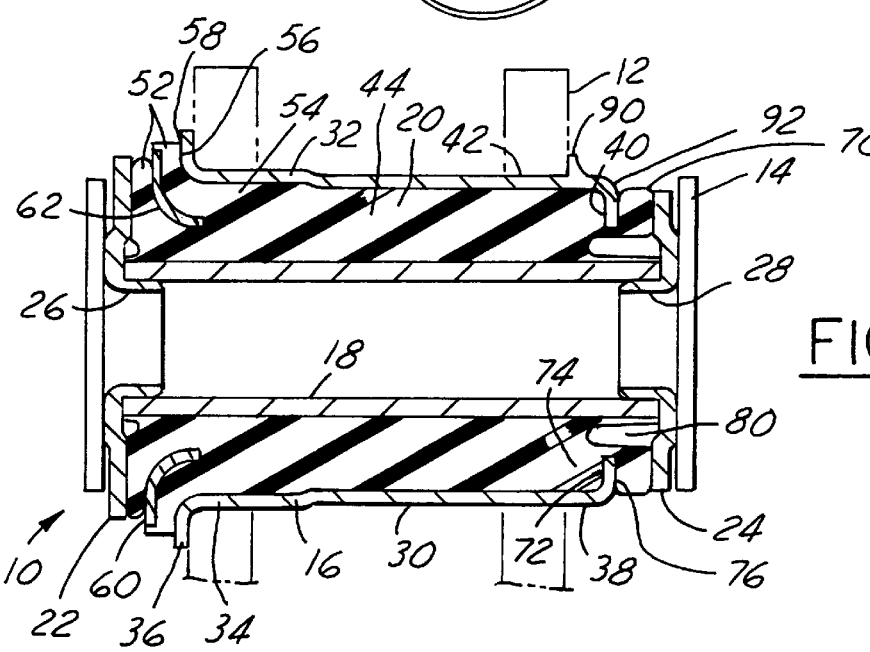
FIG. 2 is a sectional view taken from FIG. 1 of a bushing constructed in accordance with the present invention.

Referring now to FIGS. 1 and 2, the bushing device 10 is shown interconnecting a control arm 12 of a suspension to a structural member 14, which may be a frame member or a portion of a unibody structure. The bushing 10 includes a cylindrical outer sleeve member 16 and a cylindrical inner sleeve member 18 located internal of said outer sleeve member 16. A resilient member 20 occupies the annular space formed between the outer and inner sleeve members in the form of a cylindrical rubber block. The ends of the bushing device 10 include first and second end washers 22, 24 each having a tubular protuberances 26 and 28 for engaging opposite ends of the inner sleeve member.

The outer sleeve member 16 includes a stepped diameter portion consisting of a smaller diameter portion 30 and a larger diameter portion 32. A first end 34 of the outer sleeve member 16 includes an outwardly extending radial flange 36. A second end 38 of the outer sleeve member 16 includes an inwardly extending radial flange 40. The outer diameters of the smaller and larger diameter portions 30, 32 are predetermined so as to allow the bushing device to be press-fitted into mating apertures 42 in the control arm 12. The bushing is inserted with the smaller portion 30 leading the larger portion 32 to facilitate installation.

The inner sleeve member 18 has a slightly longer overall length than the outer sleeve member 16 and a diameter selected to provide adequate retention as well as a sufficient annular region 44 between the inner sleeve 18 and the outer sleeve 16 to effectively isolate the suspension member 12 from the structural member 14 as intended. The resilient member 20 interposed between the inner sleeve member 18 and the outer sleeve member 16 is secured therein by vulcanization to the outer surface of the inner sleeve member 18 and to the inner surfaces of the outer sleeve member 16 as well as the inwardly extending flange 40 and the outwardly extending radial flange 36. If a radial preload is desired in the resilient member 20, the outer sleeve member 20 can be drawn to a smaller diameter subsequent to the vulcanization step.

The resilient member 20 also includes a first projection 52 extending radially outward from a first end 54 of the resilient member 20 between tho first end washer 22 and the outwardly extending radial flange 36. An inner side 56 of the first projection 52 is vulcanized to an outward facing surface 58 of the outwardly extending radial flange 36. A plate member 60 may be vulcanized into the first projection 52 at a predetermined location to permit further tuning of the axial and radial stiffness of the bushing. The plate member 60 includes an outwardly extending circular portion 62 positioned between the first end washer 22 and the outwardly extending radial flange 36. The plate member 60 also includes a cylindrical portion 64 extending axially into the resilient member 20 between the inner and outer sleeve members.

The resilient member 20 also includes a second projection 70 extending radially outward from a second end 74 of the resilient member 20 between the second end washer 24 and the inwardly extending radial flange 40. An inner side 72 of the second projection 70 is vulcanized to an outward facing surface 76 of the inwardly extending radial flange 40. An annular groove 80 extends inwardly from the second end 74 of the resilient member 20. The annular groove 80 extends inward between the inner sleeve member 18 and the second projection 70 to a point slightly past the inwardly extending radial flange 40.

The tubular protuberances 26, 28 of the first and second end washers 22, 24 have predetermined outer diameters for press fitting into the inner sleeve member 18. This allows the first and second end washers 22, 24 to be pressed in to the inner sleeve member a predetermined distance to preload the first and second projections of the resilient member 20, thereby providing greater flexibility in axial stiffness tuning.

Figure 3:
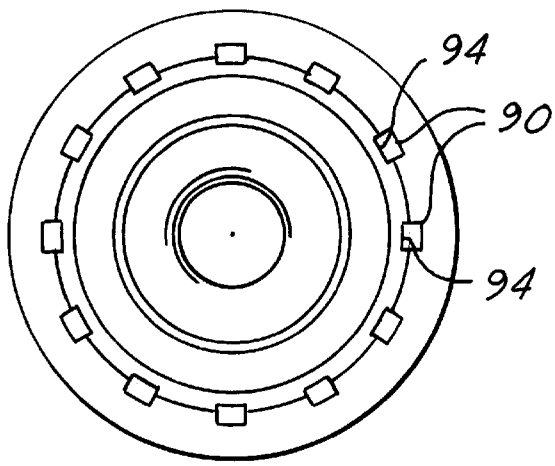
FIG. 3 is an end view taken from FIG. 1 of a bushing constructed in accordance with the present invention.
Figure 4:
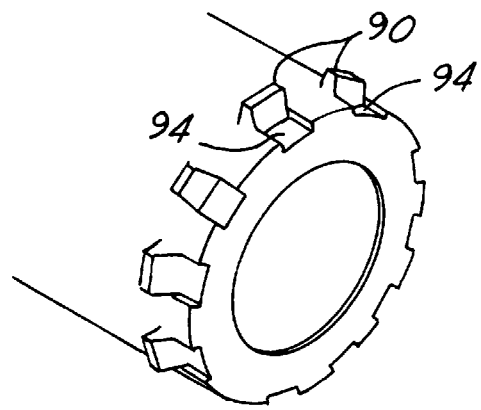
FIG. 4 is an perspective view of a bushing constructed in accordance with the present invention.

Referring to FIGS. 1, 3 and 4, the bushing device 10 also includes a plurality of stakes 90 circumferentially formed in a shoulder 92 at the second end 38 of the outer sleeve member 16 between the inwardly extending radial flange 40 and the suspension member to retain the bushing device in the suspension member 12. It is desirable to provide a plurality of stakes 90 such that at least one is in close contact with the suspension member 12, The stakes 90 are formed by forcing material from a groove 94 cut in the shoulder against the suspension member 12.

Figure 5:
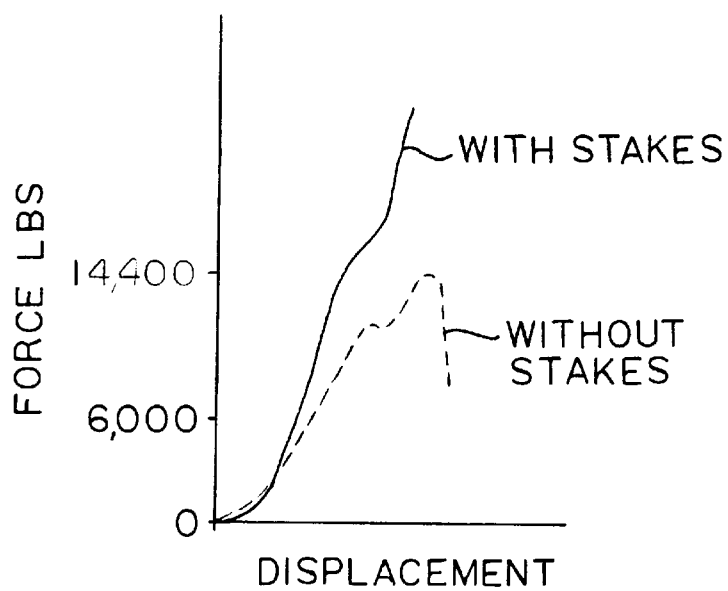
FIG. 5 is a graph showing the retention capabilities provided by a bushing constructed in accordance with the present invention.

It has been determined that desirable performance can be obtained if the stake is formed having a height substantially equal to the metal thickness of the outer sleeve member 16. It has further been observed that it is beneficial to limit the depth of the groove 92 to approximately one third the metal thickness of the outer sleeve member 16. FIG. 5 illustrates the increased axial retention provided by the stakes relative to the retention capability provided by a bushing simply press fit into the suspension member.

It should be recognized by those skilled in the arts that the components of the bushing device 10 can be made from any of the materials commonly used for bushing construction. For instance, the inner and outer sleeve members, first and second end washers and the plate member are commonly made from steel or other metallic materials. Similarly, the resilient member may be made from natural rubber of a predetermined durometer or other materials providing similar operability and functionality.

Various modifications and variations will no doubt occur to those skilled in the art to which this invention pertains. Those and all other variations which basically rely on the teachings by which this disclosure has advanced the art are properly considered within the scope of this invention as defined by the appended claims.

We claim:

1. A bushing apparatus for coupling a suspension member to a structural member of a motor vehicle, said bushing apparatus comprising:

an outer sleeve member having an outwardly extending radial flange formed at its first end and an inwardly extending radial flange formed at its second end and a predetermined outer diameter so as to allow said outer sleeve member to be press fit into said suspension member;

an inner sleeve member disposed within said outer sleeve member defining an annular region therebetween;

a first end washer extending radially outward from a first end of said inner sleeve member;

a second end washer extending radially outward from a second end of said inner sleeve member;

a resilient member disposed within said annular region between said inner and outer sleeve members and having a first projection extending radially outward from a first end of said resilient member between said outwardly extending radial flange and said first end washer and a second projection extending radially outward from a second end of said resilient member between said inwardly extending radial flange and said second end washer;

at least one stake formed on a shoulder of said outer sleeve member between said inwardly extending radial flange and the suspension member, said stake being operative to retain said outer sleeve member within the suspension member; and at least one groove formed on said shoulder of said outer sleeve member between said inwardly extending radial flange and said stake.

2. A bushing apparatus according to claim 1, wherein said first and second end washers each include a tubular protuberance sized to form a press fit relationship with an inner diameter of said inner sleeve member and are pressed into said inner sleeve member a predetermined distance so as to axially preload said first and second projections, respectively.

3. A bushing apparatus according to claim 1, wherein said second end of said resilient member further includes an annular groove disposed between said inner sleeve member and said second projection.

4. A bushing apparatus according to claim 1, further comprising a plate member having an outwardly extending circular portion disposed within said first projection at a predetermined position between said first end washer and said outwardly extending radial flange of said outer sleeve member and a cylindrical portion extending axially into said resilient member.

5. A bushing apparatus according to claim 1, comprising a plurality of stakes circumferentially disposed on said shoulder, with at least one of said plurality of stakes contacting the suspension member to retain said outer sleeve member within said suspension member.

6. A bushing apparatus for coupling a suspension member to a structural member of a motor vehicle, said bushing apparatus comprising:

an outer sleeve member having an outwardly extending radial flange formed at its first end and an inwardly extending radial flange formed at its second end and a diameter so as to allow said outer sleeve member to be press fit into said suspension member;

an inner sleeve member disposed coaxially within said outer sleeve member defining an annular region therebetween;

a first end washer extending radially outward from a first end of said inner sleeve member and having a tubular protuberance in a press fit relationship with an inner diameter of said inner sleeve member;

a second end washer extending radially outward from a second end of said inner sleeve member and having a tubular protuberance in a press fit relationship with said inner diameter of said inner sleeve member;

a resilient member disposed within said annular region between said inner and outer sleeve members and having a first projection extending radially outward from a first end of said resilient member between said outwardly extending radial flange and said first end washer and a second projection extending radially outward from a second end of said resilient member between said inwardly extending radial flange and said second end washer;

a plate member having an outwardly extending circular portion disposed within said first projection at a predetermined position between said first end washer and said outwardly extending radial flange of said outer sleeve member and an cylindrical portion extending axially into said resilient member; and a plurality of stakes circumferentially disposed on a shoulder between said inwardly extending radial flange and the suspension member, with at least one of said plurality of stakes contacting the suspension member to retain said outer sleeve member within the suspension member; and a plurality of grooves formed on said shoulder of said outer sleeve member between said inwardly extending radial flange and said stakes.

7. A bushing apparatus according to claim 6, wherein said first and second end washers are pressed into said inner sleeve member a predetermined distance so as to axially preload said first and second projections, respectively.

8. A bushing apparatus according to claim 6, wherein said second end of said resilient member further includes an annular groove disposed between said inner sleeve member and said second projection.

9. A bushing apparatus according to claim 6, wherein each of said plurality of stakes projects radially outward a distance substantially equal to a thickness of said outer sleeve member.

10. A bushing apparatus according to claim 6, wherein each of said plurality of grooves in said shoulder has a maximum depth substantially equal to one third of a thickness of said outer sleeve member.

11. A bushing apparatus for coupling a suspension member to a structural member of a motor vehicle, said bushing apparatus comprising:

an outer sleeve member having an outwardly extending radial flange formed at its first end and an inwardly extending radial flange formed at its second end and a diameter so as to allow said outer sleeve member to be press fit into said suspension member;

an inner sleeve member disposed coaxially within said outer sleeve member defining an annular region therebetween;

a first end washer extending radially outward from a first end of said inner sleeve member and having a tubular protuberance in a press fit relationship with an inner diameter of said inner sleeve member;

a second end washer extending radially outward from a second end of said inner sleeve member and having a tubular protuberance in a press fit relationship with said inner diameter of said inner sleeve member;

a resilient member disposed within said annular region between said inner and outer sleeve members and having a first projection extending radially outward from a first end of said resilient member between said outwardly extending radial flange and said first end washer and a second projection extending radially outward from a second end of said resilient member between said inwardly extending radial flange and said second end washer;

a plate member having an outwardly extending circular portion disposed within said first projection at a predetermined position between said first end washer and said outwardly extending radial flange of said outer sleeve member and an cylindrical portion extending axially into said resilient member; and a plurality of stakes circumferentially disposed on a shoulder between said inwardly extending radial flange and the suspension member, said plurality of stakes projecting radially outward a distance substantially equal to a thickness of said outer sleeve member, with at least one of said plurality of stakes contacting the suspension member to retain said outer sleeve member within the suspension member; and a plurality of grooves formed on said shoulder of said outer sleeve member between said inwardly extending radial flange and said stakes.

12. A bushing apparatus according to claim 11, wherein said first and second end washers are pressed into said inner sleeve member a predetermined distance so as to axially preload said first and second projections, respectively.

13. A bushing apparatus according to claim 11, wherein said second end of said resilient member further includes an annular groove disposed between said inner sleeve member and said second projection.

14. A bushing apparatus according to claim 11, wherein each of said plurality of stakes projects radially outward a distance substantially equal to a thickness of said outer sleeve member.

15. A bushing apparatus according to claim 11, wherein each of said plurality of grooves in said shoulder has a maximum depth substantially equal to one third of a thickness of said outer sleeve member.

* * * * *